(12) United States Patent
Hendriks et al.

(10) Patent No.: US 7,184,387 B2
(45) Date of Patent: Feb. 27, 2007

(54) OPTICAL SCANNING DEVICE

(75) Inventors: Bernardus Hendrikus wilhelmus Hendriks, Eindhoven (NL); Mathijs De Jongh, Eindhoven (NL); Willem Marie Julia Marcel Coene, Eindhoven (NL); Coen Theodorus Hubertus Fransiscus Liedenbaum, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 10/528,677

(22) PCT Filed: Sep. 18, 2003

(86) PCT No.: PCT/IB03/04092

§ 371 (c)(1),
(2), (4) Date: Mar. 21, 2005

(87) PCT Pub. No.: WO2004/029938

PCT Pub. Date: Apr. 8, 2004

(65) Prior Publication Data

US 2006/0050349 A1 Mar. 9, 2006

(30) Foreign Application Priority Data

Sep. 24, 2002 (EP) .................................. 02078957

(51) Int. Cl.
*G11B 7/135* (2006.01)
*G02B 5/30* (2006.01)

(52) U.S. Cl. ............................. 369/112.19; 369/112.07; 359/489

(58) Field of Classification Search ........... 369/112.09, 369/112.22
See application file for complete search history.

(56) References Cited

U.S. PATENT DOCUMENTS

| | | | | |
|---|---|---|---|---|
| 4,531,216 | A | * | 7/1985 | Tyler .............................. 372/9 |
| 6,115,345 | A | * | 9/2000 | Kato et al. ................ 369/112.1 |
| 6,185,168 | B1 | | 2/2001 | Kato et al. |
| 6,373,808 | B1 | * | 4/2002 | Jeong .................... 369/112.18 |

* cited by examiner

*Primary Examiner*—Wayne Young
*Assistant Examiner*—Crystal Jones
(74) *Attorney, Agent, or Firm*—Michael E. Belk

(57) ABSTRACT

An optical scanning device for scanning an optical record carrier comprising an information layer. Crosstalk cancellation is provided using a phase modulating element (40, 140) for generating a non-rotationally-symmetric phase profile in a subsidiary radiation beam. The phase profile varies with an azimuthal angle measured about the optical axis of the beam portion, the phase profile varying such that successively different phases are introduced in at least five locations which are each at successive azimuthal angles ($\phi_1$, $\phi_2$, $\phi_N$) and each at a given radial distance from the optical axis, wherein the phase profile is such that the phases introduced, when taken in modulo $2\pi$ form, successively cycle through 0 to $2\pi$ at least twice, whereby the subsidiary beam spot is provided with an intensity distribution on the information layer which overlaps that of the side-lobe of the main beam spot.

13 Claims, 9 Drawing Sheets

OPTICAL SCANNING DEVICE

The invention relates to an optical scanning device, and a phase modulating element for use therein, for scanning an optical record carrier, such as an optical disk, comprising an information layer, the device comprising a radiation source for generating a main radiation beam and a subsidiary radiation beam, and a lens system, located between the radiation source and the information layer, for converging the main radiation beam and the subsidiary radiation beam to a spot on the information layer. In particular, but not exclusively, the invention relates to an optical scanning device arranged to provide crosstalk cancellation.

Crosstalk, arising due to the fact that the scanning spot also partly illuminates the adjacent tracks, forms a limitation on the amount of data that can be read from, and hence stored on, an optical disk. The crosstalk increases when the spot is aberrated, for instance due to disk tilt. In this case the first side-lobe of the Airy disk increases in amplitude and more light is reflected from the adjacent tracks leading to more crosstalk.

A known way to reduce the crosstalk is by adding two off-axis beams to detect the signals from the adjacent tracks. These signals are used to correct the crosstalk in the main beam. The method effectively increases the spatial resolution of the main beam and is referred to herein as a three-channel method. Apart from additional means to generate these two off-axis spots, additional electronics are needed to compensate for the time delay between the main beam and the off-axis spots because of the different positions of the three spots along the tracks. A system using this method is sensitive to delay time fluctuations due to wavelength changes and decentring of the disk.

A known method of increasing the spatial resolution, using coaxial dual beams which are orthogonally polarised is described in U.S. Pat. Nos. 6,115,345 and 6,185,168. The apparatus is referred to as a "Super-Resolution Optical Head". The incoming beam is split into two orthogonally polarised beams. One of the polarised components (a main beam) passes through a polarising phase plate without phase-modulation, and is focused onto an optical disk to a diffraction limited optical spot. The other polarised component (a subsidiary beam) is modulated by the polarising phase plate, which is divided into two regions with a phase step of $(0, \pi)$ to give rise to a dual-peaked subsidiary beam spot having peaks located at the peripheral edges of the main beam. Increased spatial resolution is achieved by subtracting the high-frequency signal derived from the subsidiary beam from that of the main beam. U.S. Pat. Nos. 6,115,345 and 6,185,168 also describe alternative phase profiles for generating the subsidiary beam. The phase plate is divided into four quadrants, adding phases $0, \pi, 0, \pi$ to the sub-beam. In an alternative embodiment the phase plate is divided into N segments, the subsequent segments adding phases of $0, 2\pi/N, (2\pi/N)\times 2, (2\pi/N)\times 3, \ldots$ and $(2\pi/N)\times(N-1)$.

It is an object of the invention to improve the performance of the known crosstalk cancellation methods, whilst reducing complexity in the apparatus for performing crosstalk cancellation.

In accordance with one aspect of the invention there is provided an optical scanning device for scanning an optical record carrier comprising an information layer, the device comprising a radiation source for generating a main radiation beam and a subsidiary radiation beam, and a lens system, located between the radiation source and the information layer, for converging the main beam and the subsidiary beam to respective spots on the information layer, the main beam spot having a side-lobe, wherein the device includes:

a phase modulating arrangement for generating a non-rotationally-symmetric phase profile in the subsidiary radiation beam, the subsidiary radiation beam being of a predetermined wavelength, the phase profile varying with an azimuthal angle measured about the optical axis of the beam portion, the phase profile varying such that successively different phases are introduced in at least five locations which are each at successive azimuthal angles $(\phi_1, \phi_2, \ldots \phi_N)$ and each at a given radial distance from the optical axis, wherein the phase profile is such that the phases introduced, when taken in modulo $2\pi$ form, successively cycle through 0 to $2\pi$ at least twice, in each cycle taking at least a relatively low value and a relatively high value, whereby the subsidiary beam spot is provided with an intensity distribution on the information layer which overlaps that of the main beam spot side-lobe. In certain embodiments the relatively low value may be followed directly by the relatively high value, using a stepped structure. In further embodiments, in which the phase modulating arrangements have more complex stepped structures or smoothly-varying structures, a plurality of successively higher values may follow the relatively low value.

The invention can be used in optical recording systems to either improve the tolerances of the system or to increase the achievable data density. By cycling through 0 to $2\pi$ at least twice, improved crosstalk cancellation can be achieved relative to that achievable using a phase profile as described in the prior art described in U.S. Pat. Nos. 6,115,345 and 6,185,168. In these prior art arrangements the phase profile is divided into N segments, the N segments imparting relative phases advancing stepwise in the sequence of $0, 2\pi/N, (2\pi/N)\times 2, (2\pi/N)\times 3, \ldots$ and $(2\pi/N)\times(N-1)$. In contrast, in one embodiment of the present invention, the phase modulating arrangement has a phase profile having N segment-shaped regions, the N regions imparting a relative phase advancing stepwise in the sequence of $0, 2\pi n/N, (2\pi n/N)\times 2, (2\pi n/N)\times 3, \ldots$ and $(2\pi n/N)\times(N-1)$, where n is an integral value greater than one and the phases are taken in modulo $2\pi$ form. This provides an improved crosstalk cancellation performance.

In a further embodiment of the invention the phase modulating arrangement comprises a surface providing a continuously varying phase profile which cycles from 0 to $2\pi$ at least twice. The above-described stepwise arrangement generally approximates the continually varying phase profile of this embodiment.

In a yet further embodiment, a stepwise arrangement, which generally approximates the continually varying phase profile of the above embodiment, is used in a birefringent phase modulating arrangement. The step heights are selected such that the arrangement has substantially no effect on the main beam. In this case, a single radiation emitter can be used, and wavelength variations do not occur between the main channel and the crosstalk cancellation channel.

Preferably, as will be described in further detail below, the arrangement has a phase profile cycling through 0 to $2\pi$ three times.

The effectiveness of crosstalk cancellation can be improved by using super-resolution blocking applied to one or both of the main beam and the subsidiary beam.

According to a further aspect of the invention, there is provided an optical phase modulating element for use in an optical scanning device arrangement in accordance with embodiments of the invention.

Features and advantages of various embodiments of the invention will become apparent from the following description, given by way of example only, of preferred embodiments of the invention, which refers to the accompanying drawings, wherein.

Figure 1:
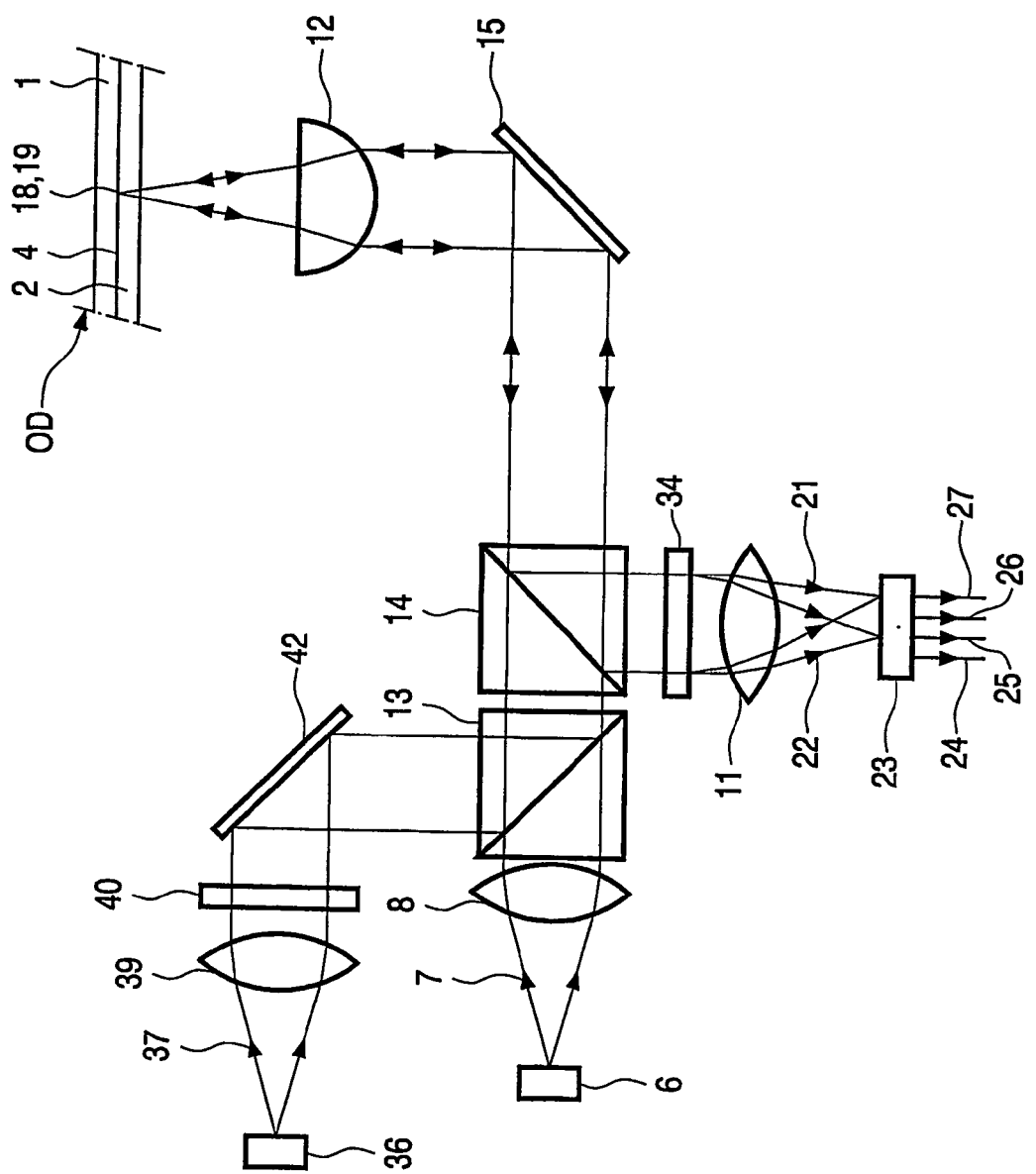
FIG. 1 is a schematic illustration of components of an optical scanning device according to an embodiment of the invention.

FIG. 1 is a schematic illustration of components of an optical scanning device, in accordance with the invention, for scanning an optical disk OD. The optical disk OD comprises a substrate 1 and a transparent layer 2, between which at least one information layer 4 is arranged. In the case of a dual-layer optical disk, as illustrated, two information layers are arranged behind the transparent layer 2, at different depths within the disk and a further transparent layer separates the two information layers.

Information may be stored in the information layer 4 of the optical disk in the form of optically detectable marks arranged in substantially parallel, concentric or spiral tracks, not indicated in FIG. 1. The marks may be in any optically readable form, e.g. in the form of pits, or areas with a reflection coefficient or a direction of magnetization different from their surroundings, or a combination of these forms.

The scanning device includes an optical pickup unit (OPU) mounted on a radially-movable arm. The OPU includes all components illustrated in FIG. 1, other than the disk OD. The scanning device includes a radiation source, which comprises a radiation emitter 6, for example a single semi-conductor laser, which emits a diverging linearly polarised main radiation beam 7. The lens system includes a collimator lens 9, an objective lens 12, and a condenser lens 11. The objective lens 12 is rigidly mounted within mechanical actuators (not shown) for performing radial tracking servo and focus servo adjustment of the position of the objective lens 12.

The collimator lens 9 refracts the diverging radiation beam 7 to form a collimated beam which passes through a first polarising beam splitter 13. A non-polarising beam splitter 14 transmits and reflects the radiation within the lens system with a 50% efficiency, independent of polarisation. On passing through the second beam splitter, the beam is directed towards objective lens 12 by folding mirror 15.

The objective lens 12 transforms the collimated radiation beam into a converging beam having a selected numerical aperture (NA), which comes to a spot 18 on the information layer 4 being scanned.

Radiation of the converging beam reflected by the information layer 4 forms a diverging reflected beam, which returns along the optical path of the forward converging beam. The objective lens 12 transforms the reflected beam to a substantially collimated reflected beam, and the beam splitter 14 separates the forward and reflected beams by transmitting the reflected beam towards the condenser lens 11.

The condenser lens 11 transforms the incident beam into a convergent reflected main beam 22 focused on detection systems, generally indicated by a single element 23 although a plurality of detector elements are used. The detection systems capture the radiation and convert it into electrical signals. One of these signals is an information signal 24, the value of which represents the information read from the information layer being scanned. Another signal is a focus error signal 25, the value of which represents the axial difference in height between the spot 18 and the information layer 4 being scanned. Another signal is a tracking error signal 26, the value of which represents a radial deviation of the spot from the track being scanned. Each of the signals 25, 26 are input to the focus servo and tracking servo mechanical actuators controlling the position of objective lens 12 during scanning.

Also included in the radiation source is a second radiation emitter 36 for emitting linearly-polarised radiation, for example a semiconductor laser. The second radiation emitter 36 generates a subsidiary radiation beam 37 having a polarisation which is orthogonal to the polarisation of the radiation beam 7 generated by the first radiation emitter 6. On exit from the radiation emitter 36, the diverging beam is collimated by collimating lens 39 and passed through phase modulating arrangement 40, which will be described in further detail below. The subsidiary beam is then folded through folding mirror 42, and coupled into the main optical light path using polarising beam splitter 13 and forms a subsidiary beam spot 19 coaxial with the main beam spot 18 on the information layer 4 of the optical disk. On reflection, the subsidiary beam is coupled out of the main optical path by non-polarising beam splitter 14 towards detection systems 23.

Also included in the optical scanning device is a polarisation-selective grating 34, which separates the main beam 22 and the subsidiary beam 21, by means of their orthogonal polarisations, to fall onto different parts of the detector system 23, so that the information carried in the two beams is detected separately in different detector channels. The output from the subsidiary beam detector element is output as a subsidiary beam information signal 27.

Figure 2:
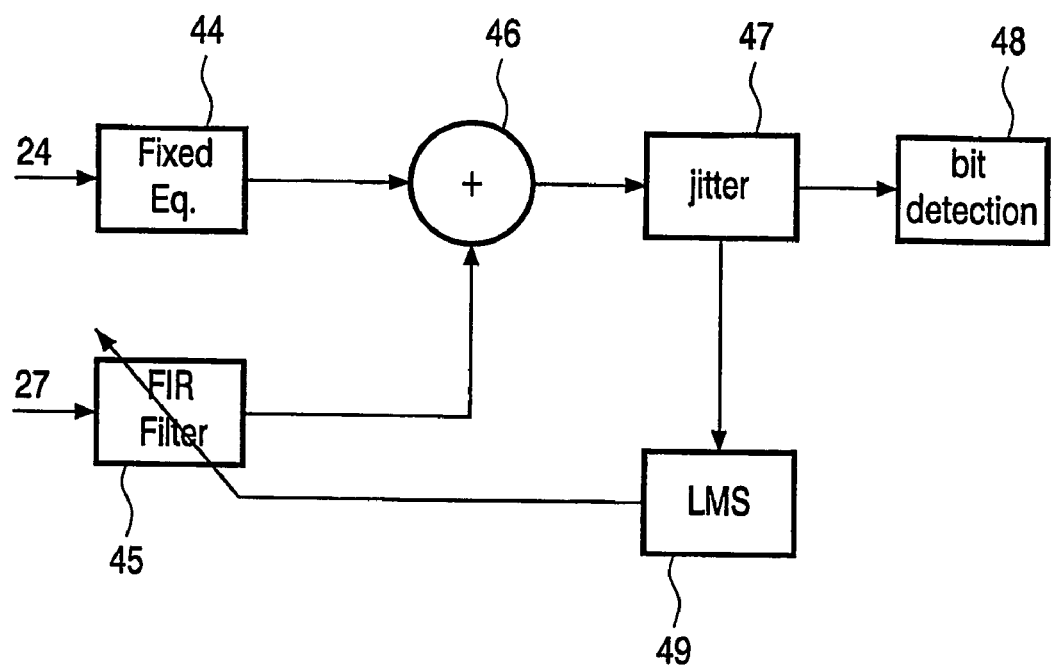
FIG. 2 is a schematic block diagram showing signal processing elements used in embodiments of the invention.

FIG. 2 shows a signal processing arrangement used to process the high frequency information signals 24, 27 from the main and subsidiary beams respectively. The main beam information signal 24 is passed through a fixed equalizer 44, for example a 5-tap equalizer, of the type used in Digital Versatile Disk (DVD) signal processing circuitry, with tap-weights for example [−5, 0, 32, 0, −5]. The subsidiary beam information signal 27 is passed through a multi-tap adaptive finite impulse response (FIR) filter 45. The filtered version of the subsidiary beam information signal 24 is added to the equalized form of the main beam information signal 27, and by this addition, a crosstalk-cancelled signal is produced in which the signal quality is improved. The signal quality can for instance be measured in terms of the jitter as detected in a phase-locked loop (PLL) 47. The tap-weights of the correction filter 45 are updated according to a "minimum-jitter" criterion, the jitter being evaluated at the zero-crossings of the crosstalk-cancelled signal. A Least-Mean- Squares (LMS) signal processing element 49 updates the tap-weights of the correction filter 45. Bit detection processing, at element 48, is carried out on the crosstalk-cancelled signal.

Figure 3:
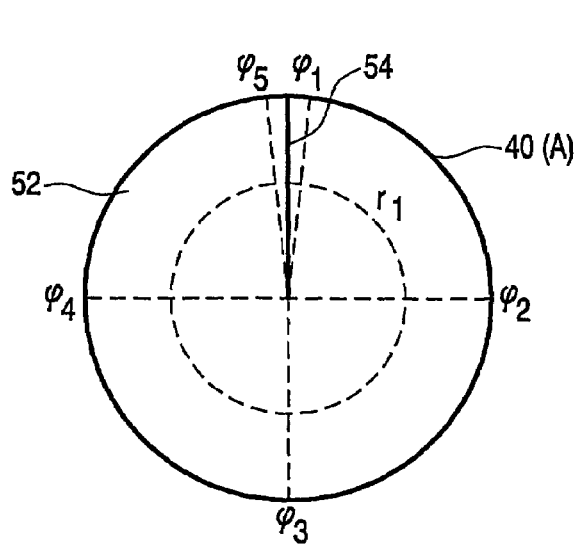
FIGS. 3 to 6 are views of an optical element in accordance with different embodiments of the invention.
Figure 3:
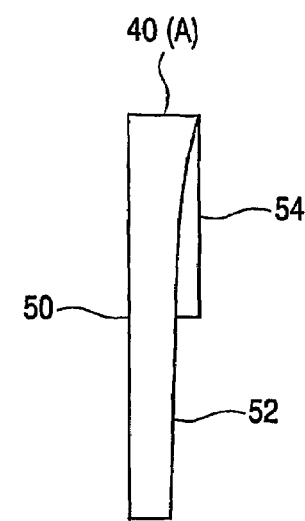

FIG. 3(A) shows a phase modulating arrangement in the form of an optical element 40(A) in accordance with one embodiment of the invention, in plan view, whilst FIG. 3(B) shows the element in side view taken from the left-hand side of the page. The phase modulating element 40(A) has a first planar surface 50 and a second non-planar surface 52. The second surface is non-rotationally-symmetric The height of the second surface 52 of the element 40(A) varies with azimuthal angle $\phi$ measured about the centre of the element, corresponding to the optical axis of the subsidiary radiation beam. In this embodiment, the second surface 52 has a height (being the distance between the first surface 50 and the second surface 52) which is constant in a radial direction. The height increases continuously, proportional to the azimuthal angle $\phi$. A height step line 54 presents a discontinuous variation in the height on the surface 52.

The relative phases produced around the element 40(A), when taken in modulo $2\pi$ form, successively cycle through zero to $2\pi$, at least twice. The number of cycles is referred to below using the reference numeral n. The second surface thus resembles a plane wound helically a single turn around the optical axis, the increase in height of the plane being equivalent to a relative phase of $n2\pi$. In this embodiment, the surface 52 is arranged such that n=2, although in a further embodiment n=3, and in a yet further embodiment n=4. In terms of a definition used for the present invention, the surface 52 includes 5 locations, corresponding to the intersections between the angles $\phi_1, \phi_2, \phi_3, \phi_4$ and $\phi_5$ with a circle of constant radius $r_1$. Here, the first azimuthal angle $\phi_1$ is located immediately to one side of the height step line 54, whilst the last azimuthal angle $\phi_5$ is located immediately to the other side of the height step line 54. In this embodiment, the relative phase introduced at the location corresponding to angle $\phi_1$, $\Phi(\phi_1)=\delta$, where $\delta$ represents the negligible height relative to zero (at the height step size 54) due to $\phi_1$ being spaced from the height step line 54 by a negligible amount. Taking successive relative phases, $\Phi(\phi_2)=\pi$, $\Phi(\phi_3)=2\pi$, $\Phi(\phi_4)=3\pi$, and $\Phi(\phi_5)=4\pi-\delta$. When taken in terms of modulo $2\pi$ form, the varied height of the surface 52 provides a phase profile such that the phases introduced successively cycle through 0 to $2\pi$, in each of two cycles, varying continuously from relatively low values to relatively high values. The element 40(A) generates a generally annular subsidiary beam spot.

Figure 4:
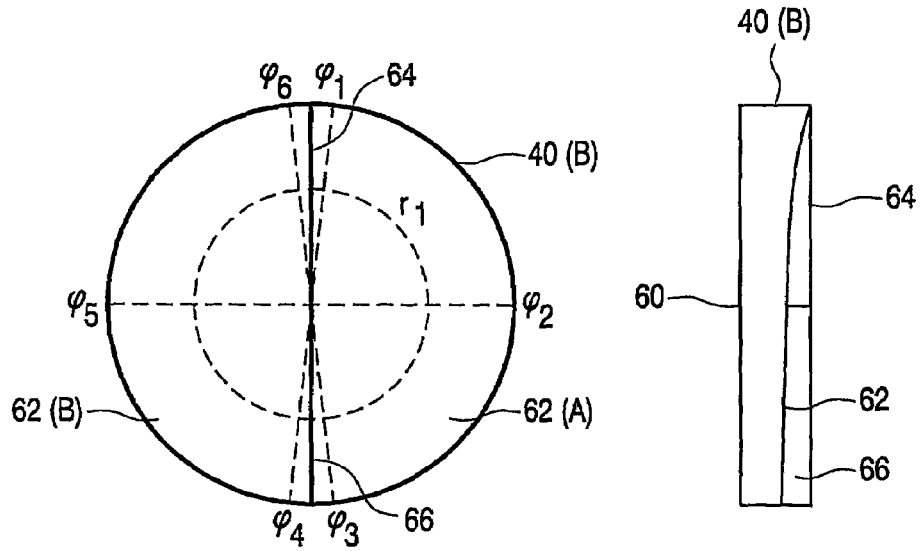

FIGS. 4(A) and 4(B) show, in plan and side view respectively, a second embodiment of phase modulating element 40(B). In this embodiment, the phase modulating element 40(B) includes a planar first surface 60 and a non-planar second surface 62, which is divided into two half-segments 62(A) and 62(B). The two segments are separated by respective height step lines 64, 66. In each of the segments, the height of the surface 62 varies continuously from 0 to $2\pi$, increasing linearly with the azimuthal angle $\phi$. In this embodiment, $\Phi(\phi_1)=\delta$, $\Phi(\phi_2)=\pi$, $\Phi(\phi_3)=2\pi-\delta$, $\Phi(\phi_4)=\delta$, $\Phi(\phi_5)=\pi$, and $\Phi(\phi_6)=2\pi-\delta$. Since the wavefront modulating characteristics of the phase profile are related to the relative phases when taken in modulo $2\pi$ form, the element 40(B) has the same effect as the element 40(A), and produces the same form of annular subsidiary beam spot.

Figure 5:
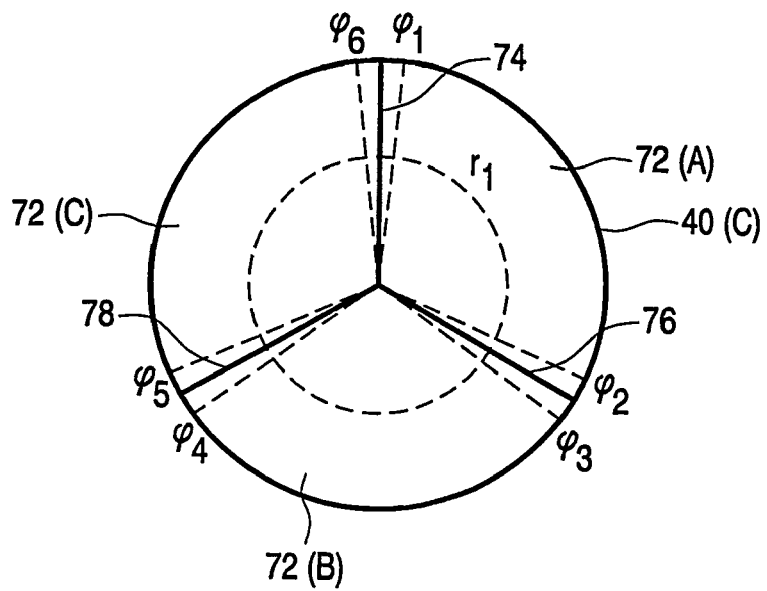

FIG. 5 illustrates a third embodiment of phase modulating element 40(C), in which the phase profile cycles through 0 to $2\pi$ three times, i.e. n=3. As discussed above, the first embodiment of phase modulating element 40(A) may be arranged such that n=3. The third embodiment of the invention has the equivalent effect as the first embodiment 40(A) when n=3. In this embodiment, the non-planar surface 72 of the element 40(C) is divided into three segments 72(A), 72(B), 72(C), separated by respective height step lines 74, 76, 79. In this embodiment, the height of the surface 72 increases linearly with azimuthal angle within each of the segments, to generate a corresponding relative phase cycling from 0 to $2\pi$ in each segment. Thus, in this embodiment, $\Phi(\phi_1)=\delta$, $\Phi(\phi_2)=2\pi-\delta$, $\Phi(\phi_3)=\delta$, $\Phi(\phi_4)=2\pi-\delta$, $\Phi(\phi_5)=\delta$ and $\Phi(\phi_6)=2\pi-\delta$. In terms of the definition of the invention, at the six locations corresponding to the given azimuthal angles and the constant radius $r_1$, the relative phases introduced at the successive locations cycle through 0 to $2\pi$ three times.

Figure 6:
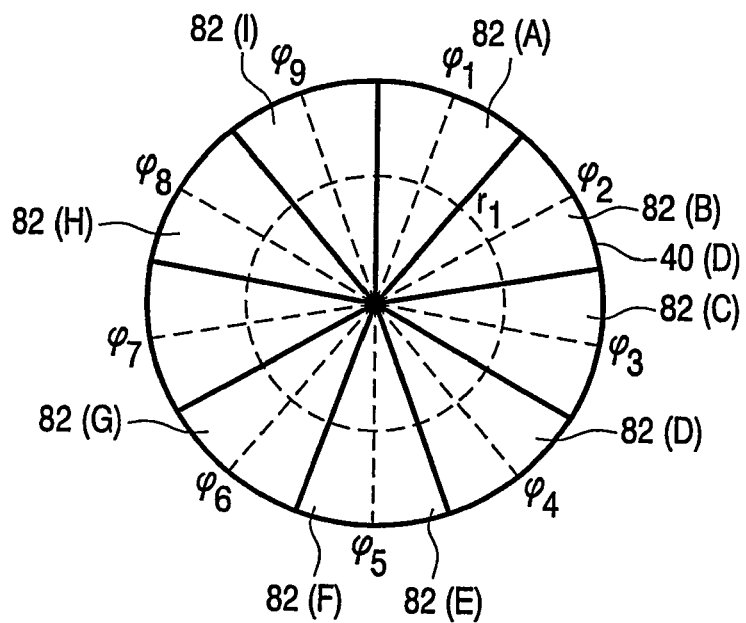

FIG. 6 illustrates a further embodiment of phase modulating element 40(D), whereby the phase profile generated by the phase modulating element 40(C) described above is approximated using corresponding segmented regions 82(A) to 82(I) in a fourth embodiment. In this embodiment, adjacent segments are separated by a corresponding height step line, and each segment takes a constant height. The height of each of the nine segments 82(A) to 82(1) corresponds with the height of the corresponding surface 72 of the phase modulating element 40(C) at the angular position at which the segment first appears on the surface 82 (as illustrated in FIG. 6, the most anti-clockwise part of the segment). Thus, in this embodiment, the continuously-varying surface heights in the third embodiment of phase modulating element 40(C) are approximated by a series of corresponding stepped segments of constant-height and discontinuous step heights between segments in each of the three cycles in relative phase from 0 to $2\pi$. The second surface is similar to a series of steps of spiral stairs. In this embodiment, $\Phi(\phi_1)=0$, $\Phi(\phi_2)=2\pi/3$, $\Phi(\phi_3)=4\pi/3$, $\Phi(\phi_4)=0$, $\Phi(\phi_5)=2\pi/3$, $\Phi(\phi_6)=4\pi/3$, $\Phi(\phi_7)=0$, $\Phi(\phi_8)=2\pi/3$, and $\Phi(\phi_9)=4\pi/3$. Thus, the phase profile is such that the phases introduced, when taken in modulo $2\pi$ form, successively cycle through 0 to $2\pi$, in each cycle taking successively higher values. More generally, in this embodiment, the phase modulating element has a phase profile having N segment-shaped regions, the N regions imparting relative phases advancing stepwise in the sequence of 0, $2\pi n/N$, $(2\pi n/N)\times 2$, $(2\pi n/N)\times 3$, ... and $(2\pi n/N)\times(N-1)$, where n is an integer greater than one and the phases are taken in modulo $2\pi$ form. Preferably, as will be described in further detail below, the element has a phase profile as above, where n=3.

Consider the effect of the phase modulating element 40(A), which is similar to the effect of the other embodiments described above. This element 40 introduces a phase $\Phi(\phi)$ with $(\rho,\phi)$ the polar coordinates of the entrance pupil of the objective lens 12. The amplitude distribution $U(r,\psi)$ of the spot in the focal plane is then given by (see Born and Wolf, "Principal of Optics", Sixth Edition, Pergarnon Press, Chapter 9):

$$U(r,\psi) = \frac{1}{\pi NA^2} \int_0^{NA} \int_0^{2\pi} e^{ik\rho r \cos(\psi-\varphi)} e^{ik\Phi(\varphi)} \rho \, d\rho \, d\varphi \qquad (1)$$

where r and $\psi$ are the polar coordinates of the focal plane, k the wavevector ($=2\pi/\lambda$) and NA the numerical aperture of the converging beam. To simplify the integral expression (1) we write the phase term $\text{Exp}[i(\Phi(\phi)]$ as a series expansion in the following way:

$$e^{i\Phi(\varphi)} = \sum_{m=-\infty}^{\infty} a_m e^{im\varphi} \quad (2)$$

Substituting (2) in (1) results in the following expression:

$$U(r,\psi) = \sum_{m=-\infty}^{\infty} \frac{a_m}{\pi NA^2} \int_0^{NA} \int_0^{2\pi} e^{ik\rho r \cos(\psi-\varphi)} e^{im\varphi} \rho\, d\rho\, d\varphi \quad (3)$$

Then integrating with respect to φ yields:

$$U(r,\psi) = \sum_{m=-\infty}^{\infty} \frac{2a_m e^{im\psi}}{NA^2} i^m \int_0^{NA} J_m(k\rho r) \rho\, d\rho \quad (4)$$

where $J_m$ are Bessel functions of integer order. For $m \neq 0$ the spot becomes generally annular and the intensity distribution depends on the azimuthal angle ψ.

Taking for example the case where $\Phi(\phi)=0$ we have $a_m=0$ for $m \neq 0$ and $a_0=1$. Equation (4) can then be written as:

$$U(r,\psi) = \frac{2}{NA^2} \int_0^{NA} J_0(k\rho r) \rho\, d\rho = \frac{2J_1(kNAr)}{kNAr} \quad (5)$$

The corresponding intensity distribution is then given by:

$$I(r,\psi) = \left| \frac{2J_1(kNAr)}{kNAr} \right|^2 \quad (6)$$

which is the well known Airy distribution, which is seen in the main beam spot.

Taking, for the subsidiary beam phase profile in accordance with an embodiment of the invention, the case where $\Phi(\phi)=3\phi$, hence the n=3 case, we have $a_m=0$ for $m \neq 3$ and $a_3=1$. Equation (4) can then be written as $$U(r,\psi) = \frac{2e^{i3\psi}}{NA^2} i^3 \int_0^{NA} J_3(k\rho r) \rho\, d\rho \quad (7)$$

The corresponding intensity distribution is $|U(r,\psi)|^2$.

In embodiments of the invention, where the non-rotationally-symmetric surface is continuous, the phase profile generated by the phase modulating element 40 is substantially corresponds with one wherein in equation (2) above, one of the following applies: $a_m=0$ for $m \neq 2$ and $a_2=1$; $a_m=0$ for $m \neq 3$ and $a_3=1$; or $a_m=0$ for $m \neq 4$ and $a_4=1$. In embodiments of the invention where an ideal phase profile is approximated, for example by means of a stepped profile, one of the coefficients $a_2$, $a_3$ or $a_4$ preferably dominate the remaining coefficients, so that when an absolute value of the coefficient is taken a value of for example 0.5 or above is obtained. This characteristic is preferred so as to provide an annular intensity profile which is sufficiently well-defined in the area of the side-lobe of the main spot for crosstalk cancellation purposes.

Figure 7:
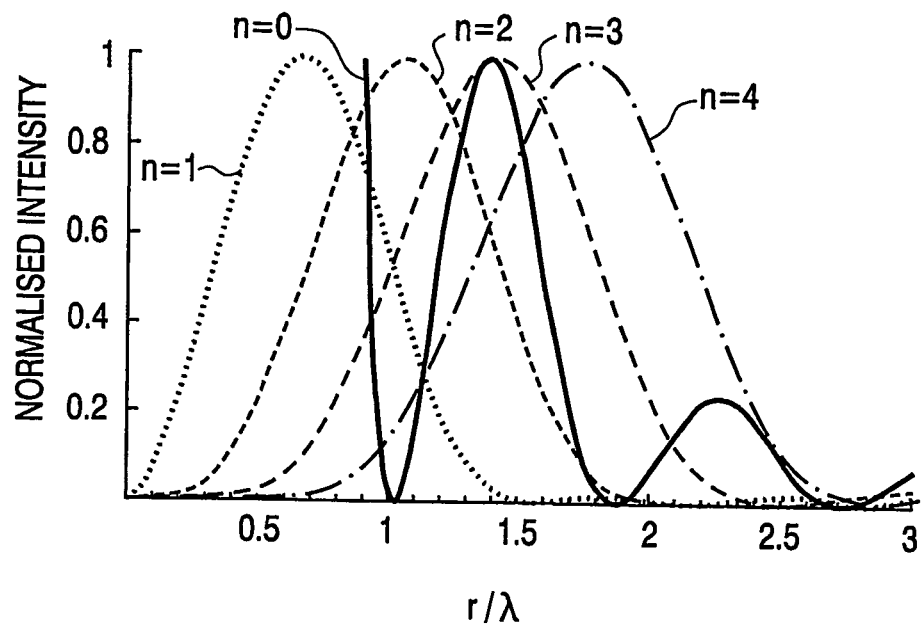
FIG. 7 shows plots of intensity distributions for spots of different types.

FIG. 7 shows plots of the intensity distribution in the radial direction of the subsidiary beam spot for each of n=1, n=2, n=3, and n=4 against the intensity distribution for the main beam spot, of n=0. The intensity distribution of the subsidiary beam spot is rotationally symmetric for integer values of n. For ease of comparison, in the plots each maximum intensity for n>0 is scaled in such a way that it is the same as the maximum value of the intensity of the first side lobe of the n=0 case, which is set equal to one. In the present invention, the case n=1 is discounted, due to the small degree of overlap between the inner annular part of the subsidiary beam spot and the first side-lobe of the main beam spot. However, each of n=2, n=3 and n=4 have sufficient degrees of overlap to provide significant improvements in crosstalk cancellation.

Figure 8:
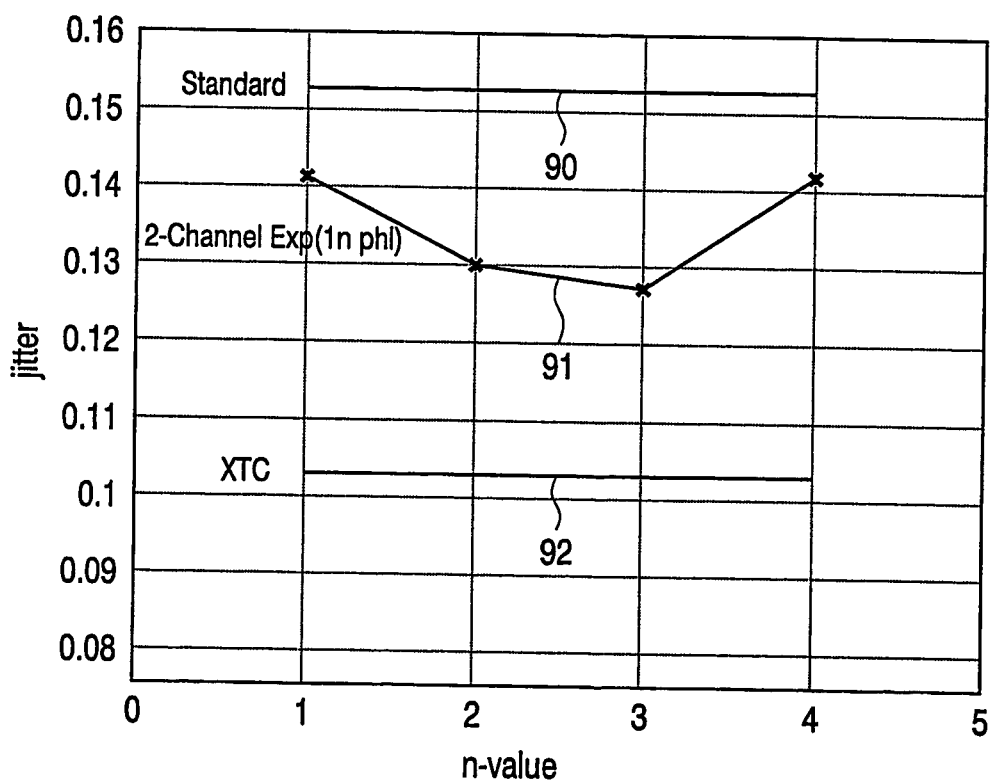
FIG. 8 shows jitter produced using different crosstalk cancellation methods.

FIG. 7 shows that for n=3 the best overlap occurs. This case gives rise to a better cancellation of crosstalk from neighbouring tracks and a better reduction of inter-symbol interference of the track being scanned. The reduction of crosstalk is shown in the plots of FIG. 8 obtained from simulations. The simulations used were based on waveforms generated via scalar diffraction computations for a ROM-type of disk (with d=2 RLL coding, and DVD-like parameters, apart from a more ambitious track-pitch, set equal to 680 mn instead of 740 nm). The simulations included 0.9° of radial disk tilt.

Referring to FIG. 8, plot 90 shows a jitter level seen in a standard arrangement, where no crosstalk cancellation is used. This is on the verge of unacceptable (typically, jitter values above 15% are unacceptable for DVD). Plot 91 shows a plot showing performance at different n-values for embodiments of the invention, which are all within acceptable levels. Plot 92 shows conventional crosstalk cancellation performance, achieved using the more complex three channel prior art approach.

Figure 9:
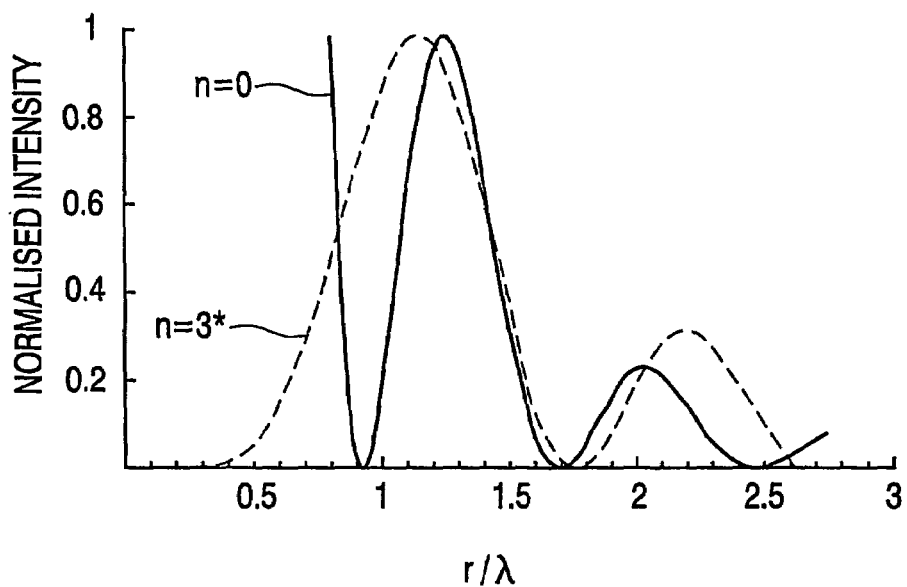
FIGS. 9 and 10 show plots of intensity distributions for spots of different types.

From FIG. 7 it is possible to observe that the overlap of the n=3 subsidiary beam spot with the first side lobe of the main beam spot is still not optimal. In particular, the width of the annular n=3 spot is wider than the first side lobe of the Airy spot. This can be improved by using super resolution blocking, for example applied to the n=3 subsidiary beam spot. Blocking can be achieved by covering the appropriate part of the objective lens with a polarisation-selective coating. Blocking for instance the area $0<r/r_{max}<0.75$ on the subsidiary beam entrance pupil results in a spot intensity profile (intensity plot n=3*) as shown in FIG. 9. Although the inner radius of the first annular part of the spot remains the same, the outer radius has been significantly reduced such that it coincides with the outer radius of the first side lobe of the main beam spot (intensity plot n=0).

Figure 10:
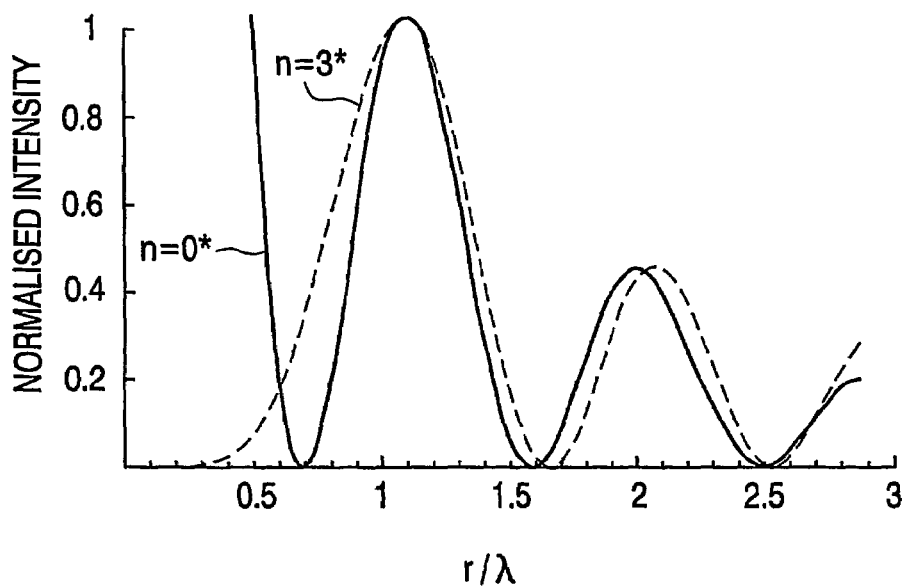

It is possible to further improve the crosstalk cancellation performance using not only super-resolution blocking for the subsidiary beam but also for the main beam. Blocking can be achieved using an opaque coating on the objective lens where both beams are to be blocked, and using a polarisation selective coating where only one of the two beams is to be blocked. By adjusting the super-resolution levels for the two-beams one can also alter the intensity profile of the first side-lobe of the main beam spot such that it coincides closely with the first annular part of the subsidiary beam spot for the n=3 case. FIG. 10 shows the improved overlap first super-resolution side lobe of the subsidiary beam spot (intensity plot n=3), where the entrance pupil is blocked for $0<r/r_{max}<0.95$ and where the entrance pupil for the super-resolution main beam spot (intensity plot n=0*) is blocked for $0<r/r_{max}<0.75$. Comparing FIG. 10 with FIG. 9, better overlap is observed. Blocking $0<r/r_{max}<0.75$ in the main beam results in a super-resolution spot with a full width at half maximum (FWHM) which is 0.79 times the FWHM of the standard Airy spot. Consequently, this would in principle allow an increase in data density of 60%.

Figure 11:
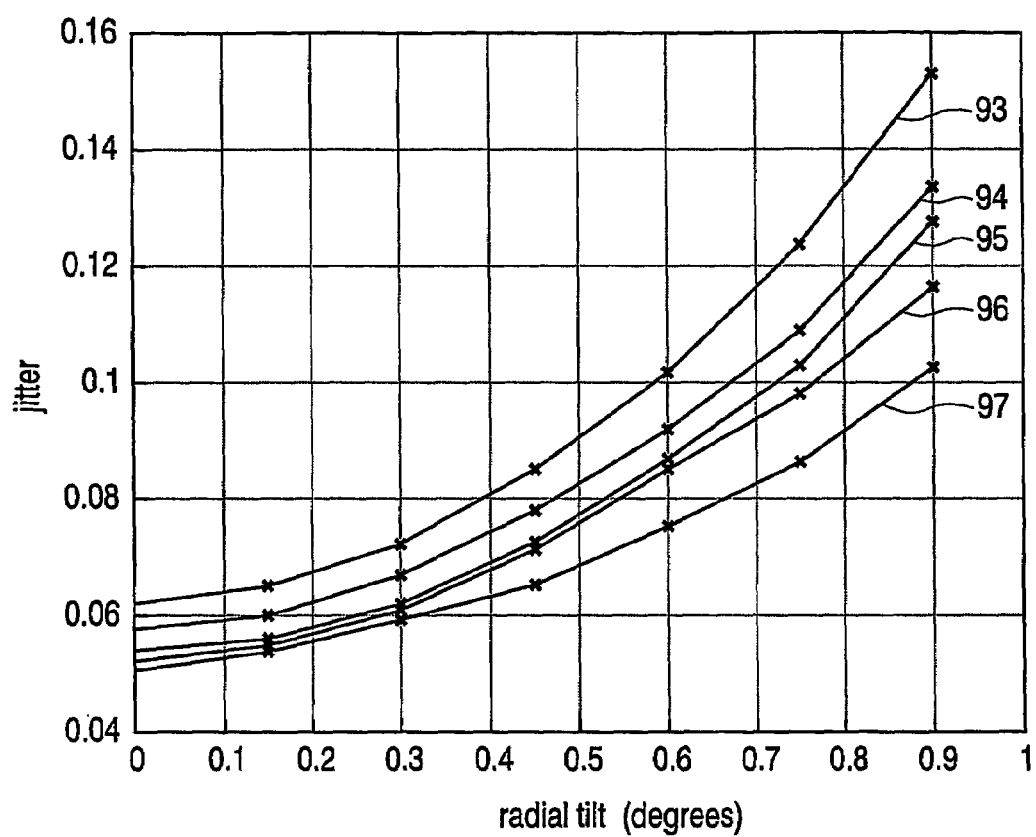
FIG. 11 shows plots of jitter versus radial tilt for different crosstalk cancellation methods.

FIG. 11 shows plots of jitter in the crosstalk-cancelled information signal as a function of radial disk tilt for various crosstalk cancellation methods. Plot 93 shows the jitter in the case of a standard arrangement, in which no crosstalk cancellation is implemented. Plot 94 shows the jitter in the case of crosstalk cancellation achieved using a (0, π) phase modulating element as described in U.S. Pat. Nos. 6,115,345 and 6,185,168. Plot 95 shows the jitter in the case of crosstalk cancellation achieved using an n=3 phase modulating element as illustrated and described in relation to FIG. 5. Plot 96 shows the jitter in the case of crosstalk cancellation achieved using the n=3 case, in which super-resolution blocking of the subsidiary beam is used as described in relation to FIG. 9. Finally, plot 97 shows the jitter in the case of crosstalk cancellation achieved using the prior art three channel crosstalk cancellation method. As can be seen from FIG. 11, two channel crosstalk cancellation can be achieved using the present invention which approaches the performance of the three channel prior art method, and at low radial tilt even provides improved performance.

Figure 12:
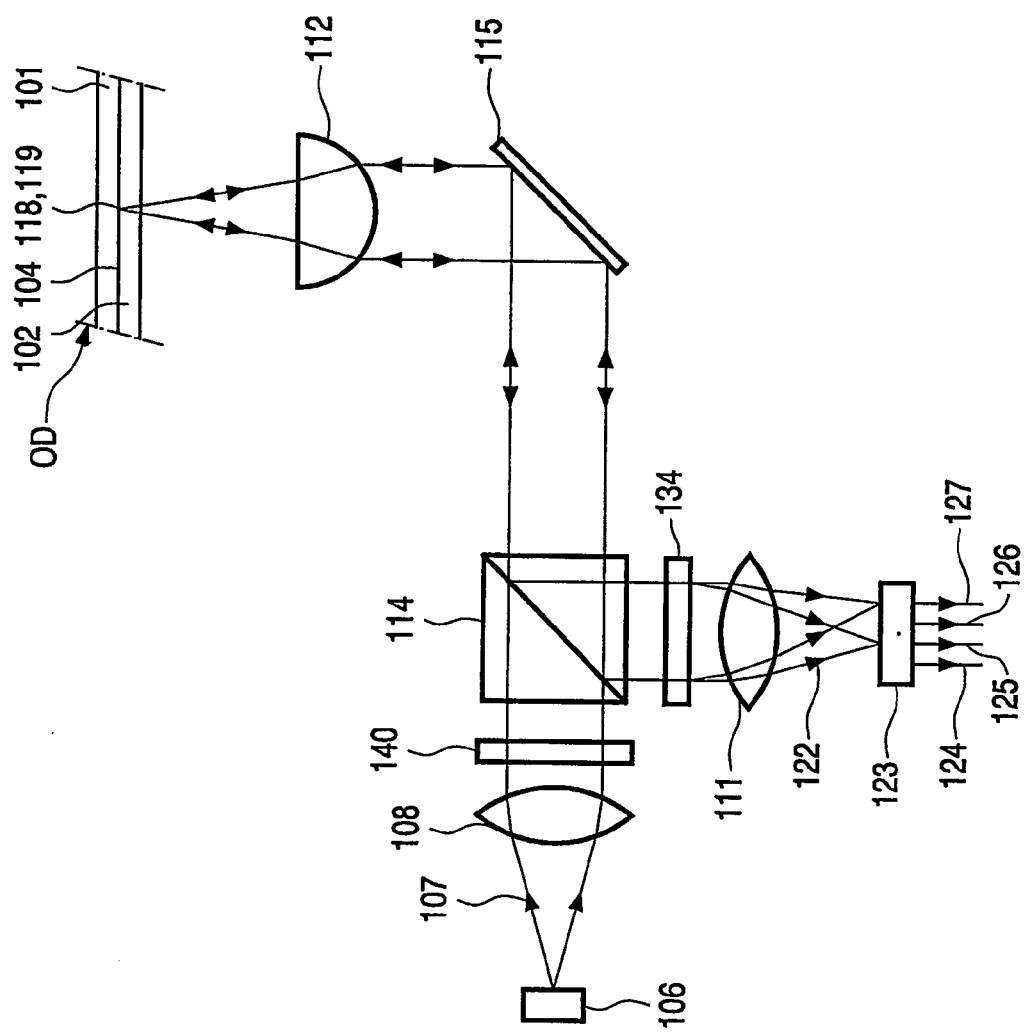
FIG. 12 is a schematic illustration of components of an optical scanning device arranged in accordance with an alternative embodiment of the invention.

FIG. 12 illustrates a further embodiment of an optical scanning device in accordance with the invention. Whilst in the embodiments described above, two radiation emitters providing orthogonally polarised radiation beams and a phase modulating arrangement is used in only one of the beam paths, similar functionality can be provided using fewer components instead using a birefringent phase modulating arrangement and a single radiation emitter providing a radiation beam polarized at an orientation of, for example, 45° to the axis of birefringence. Other angles of orientation may be used, for example to reduce the amount of radiation present in the subsidiary beam relative to that in the main beam.

In FIG. 12, the elements corresponding to elements illustrated in FIG. 1 are referenced using similar reference numerals incremented by 100, and the respective composition and functionality thereof should be taken to apply here. In this embodiment, the subsidiary beam, instead of being generated by a separate optical branch, is generated by a birefringent phase modulating element 140. A linearly polarised radiation beam 107 generated by a radiation source 106 comprising e.g. a single semiconductor laser. The optical axis of the birefringent element 140 is positioned at 45° to the direction of polarisation of the beam 107. The birefringent phase modulating element 140 has no phase modulating effect on one polarisation component, which forms the main beam, and has a phase modulating effect on the orthogonal polarisation component, which forms the subsidiary beam. In this arrangement, the main beam and the subsidiary beam, following their non-modulation and modulation by the phase modulating element 140 respectively, follow the same paths as the main and subsidiary beams in the first embodiment (FIG. 1) after their combination using polarising beam splitter 13.

The phase modulating element 140 is a stepped birefringent structure such that for one polarisation the structure has no effect while for the orthogonal polarisation a linearly varying azimuthal phase profile is approximated, in a manner similar to that of the segmented phase modulating element 40(D) described above in relation to FIG. 6. The birefringent element 140 has a similar structure to that of the segmented element 40(D), except that the step heights are different and the material of the element is birefringent.

The element 140 is formed from birefringent material having an extraordinary refractive index $n_e$ and an ordinary refractive index $n_o$. In the following the change in refractive index due to difference in wavelength is neglected and therefore the refractive indices $n_e$ and $n_o$ are approximately independent of the wavelength. In this embodiment, and by way of illustration only, the birefringent material is C6M/E7 present 50/50 (in % by weight) with $n_o=1.51$ and $n_e=1.70$. Alternatively, for example, the birefringent material may be C6M/C3M/E7 present 40/10/50 (in % by weight) with $n_o=1.55$ and $n_e=1.69$. Here, the E7, C3M and C6M codes used refer to the following formulations:

E7 is formed from 51% C5H11cyanobiphenyl, 25% C5H15cyanobiphenyl, 16% C8H17cyanobiphenyl and 8% C5H11 cyanotriphenyl;

C3M is formed from 4-(6-acryloyloxypropyloxy)benzoyloxy-2-methylphenyl 4-(6-acryloyloxypropyloxy)benzoate; and C6M is formed from 4-(6-acryloyloxyhexyloxy)benzoyloxy-2-methylphenyl 4-(6-acryloyloxyhexyloxy) benzoate The birefringent element 140 is formed such that its refractive index equals $n_e$ when traversed by a radiation beam having a polarisation which is aligned in one direction perpendicular to the optical axis (along an X-axis) and no when traversed by a radiation beam having a polarisation along the orthogonal Y-axis. In the following the polarization of a radiation beam is called "$p_e$" and "$p_o$" where aligned with the X-axis and the Y-axis, respectively.

In the following embodiment, and by way of illustration only, the phase change Φ of the main beam wavefront due to the segment structure remains unaffected, since the beam has polarization $p_e$, while for the subsidiary beam, having the orthogonal polarization $p_o$, it approximates the following phase profile:

$$\Phi(\phi)=3\phi \text{ for } 0 <\phi 2\pi. \tag{8}$$

The structure is made of birefringent material having, say, $n_o=1.51$ and $n_e=1.70$. The wavelength of the radiation is for example λ=650 nm. Furthermore, the beam incident on the optical disk OD has a numerical aperture of NA=0.65. The element 140 includes nine segments of equal area, each segment having a respective step height $h_j$. Consider a step height $h_{ref}$ which is defined as follows:

$$h_{ref} = \frac{\lambda}{n_e - n_s}$$

where $n_s$ is the refractive index of the medium adjacent the segmented structure that is, in the following and by way of illustration only, air, i.e. $n_s=1$. This step height gives rise to a phase change equal to 2π for the beam having polarization $p_e$. Hence when the step height $h_j$ of the stepped structure are integer multiples of $h_{ref}$, the phase change equals zero (when taken in modulo 2π form) for the main beam having polarization $p_e$.

For the subsidiary beam, which has polarization $p_o$, the above steps no longer introduce phase steps equal to a multiple of 2π. Table 1 below gives the relative phase introduced by the first twelve step heights which are selected as integral multiples m of $h_{ref}$ the $p_o$ polarization.

TABLE 1

| m | m h$_{ref}$ [μm] | Φ(p$_o$)/2π (modulo 1) |
|---|---|---|
| 1 | 0.9286 | 0.7286 |
| 2 | 1.8572 | 0.4572 |
| 3 | 2.7858 | 0.1857 |
| 4 | 3.7144 | 0.9143 |
| 5 | 4.6430 | 0.6429 |
| 6 | 5.5716 | 0.3715 |
| 7 | 6.5002 | 0.1000 |
| 8 | 7.4288 | 0.8286 |
| 9 | 8.3574 | 0.5572 |
| 10 | 9.2860 | 0.2858 |
| 11 | 10.2146 | 0.0143 |
| 12 | 11.1432 | 0.7429 |

Note that there are eleven substantially different step heights possible for the p$_o$ polarization fulfilling the requirement that for the p$_e$ polarization the steps gives rise to phase heights which are a multiple of 2π. Where m=12 and above, similar amounts of phase are generated to that generated for one of the first eleven step heights. The different step heights of the phase modulating element can be made using a lathe that rotates the element around its optical axis and which has a cutting tool that makes as many excursions in the direction of the optical axis during each revolution of the element as are necessary to generate the pattern of step heights.

In this embodiment, the phase modulating element 140 has a structure similar to that illustrated and described in relation to FIG. 6 above, with nine segmented regions in which a respective constant step height, hi, is provided as described below in table 2.

TABLE 2

| j | φ$_{begin}$/2π | φ$_{end}$/2π | m | h$_j$ [μm] | Φ(p$_o$)/2π (modulo 1) |
|---|---|---|---|---|---|
| 1 | 0 | 0.111 | 0 | 0 | 0.0000 |
| 2 | 0.111 | 0.222 | 6 | 5.5716 | 0.3715 |
| 3 | 0.222 | 0.333 | 5 | 4.6430 | 0.6429 |
| 4 | 0.333 | 0.444 | 0 | 0 | 1.0000 |
| 5 | 0.444 | 0.555 | 6 | 5.5716 | 1.3715 |
| 6 | 0.555 | 0.666 | 5 | 4.6430 | 1.6429 |
| 7 | 0.666 | 0.777 | 0 | 0 | 2.0000 |
| 8 | 0.777 | 0.888 | 6 | 5.5716 | 2.3715 |
| 9 | 0.888 | 1.000 | 5 | 4.6430 | 2.6429 |

Figure 13:
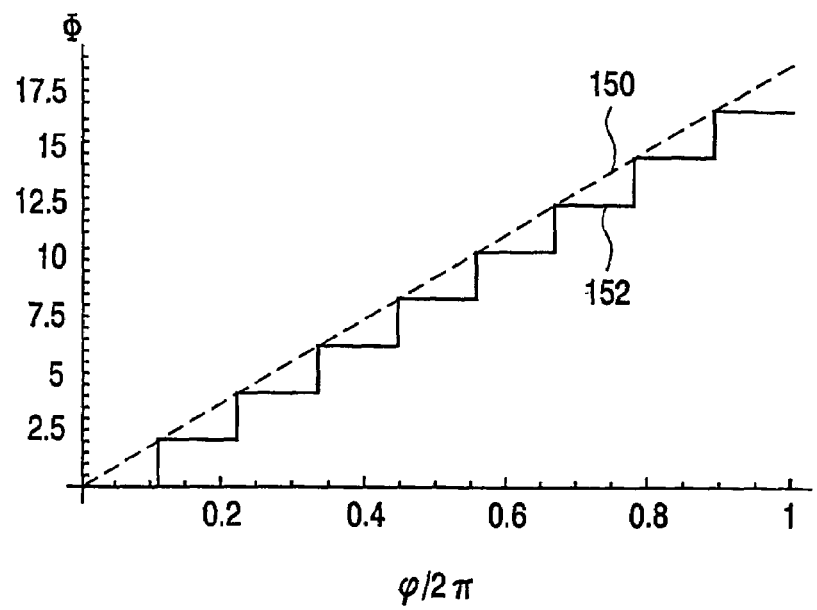
FIG. 13 shows step height approximations used in an embodiment of the invention.

FIG. 13 plots, using line 152, the phase introduced by the segmented structure as defined in table 2 in the subsidiary beam by each successive segment in the phase modulating element 140 as a function of the azimuthal angle φ. For the sake of illustration, the phase generated in each cycle of 2π is successively incremented by 2π to show the approximation with a continually varying phase profile 150 of an appropriate form for n=3.

Figure 14:
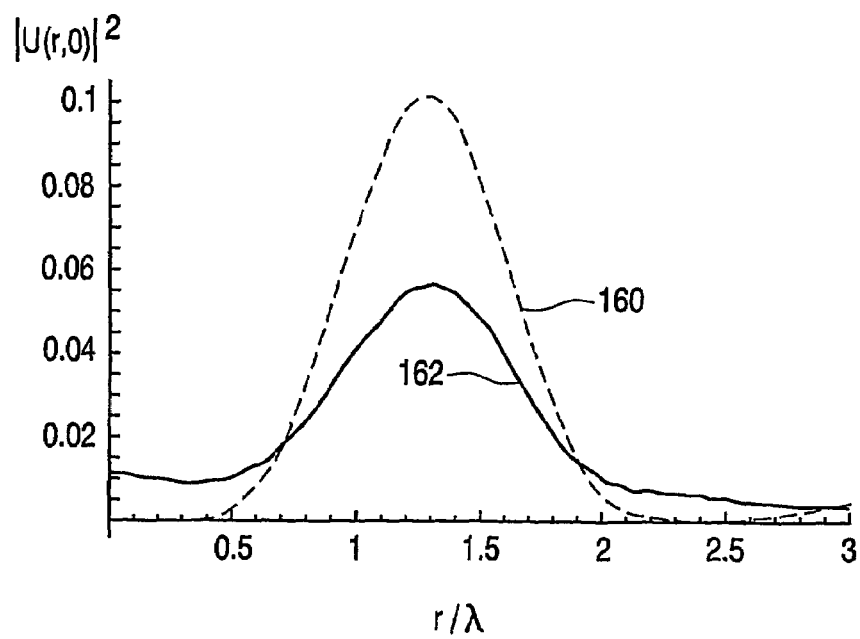
FIG. 14 shows plots of intensity distribution for spots of different types.

FIG. 14 plots, using line 162, the generally annular spot shape generated by the segmented structure as defined in table 2. The intensity is normalised against, and shown with a plot of the intensity profile achieved with a continually varying phase profile 150 of an appropriate form for n=3. Note that making the structure out of only nine uniform-height segments results in an annular spot substantially approximating the desired spot intensity profile. Using the expansion defined in Equation (2) we find for this case that the absolute value of the dominating coefficient, |a$_3$|=0.81.

It should be understood that, although 9 segments are used in this embodiment, other numbers of segments may be used. Preferably, the number of segments is between 5 and 25, to provide sufficient crosstalk cancellation efficiency whilst maintaining a relatively small number of regions, for manufacturing efficiency. For similar reasons, preferably at least three segments, and preferably less than six segments, are used in each cycle of phase from 0 to 2π.

It is noted that the surface structures used in the above-described embodiments are substantially constant in thickness along the radial direction in each of the phase modulating elements. Whilst this is preferred in the case where the desired phase profile is provided based on a planar element (e.g. on a plane parallel plate) and while the wavefront of the incoming beam is flat, in alterative embodiments the desired phase profile is provided on a curved surface (e.g. that of a lens) and/or the incoming beam has a vergence with a best fit radius that substantially differs from the curvature of the surface. In these alternative embodiments the surface structure may be adjusted in the radial direction so as to generate the desired phase change patterns in the azimuthal direction.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. An optical scanning device for scanning an optical record carrier comprising an information layer, the device comprising a radiation source for generating a main radiation beam and a subsidiary radiation beam, and a lens system, located between the radiation source and the information layer, for converging the main beam and the subsidiary beam to respective spots on the information layer, the main beam spot having a side-lobe, wherein the device includes:

a phase modulating arrangement for generating a non-rotationally-symmetric phase profile in a subsidiary radiation beam, the subsidiary radiation beam being of a predetermined wavelength, the phase profile varying with an azimuthal angle measured about the optical axis of the beam portion, the phase profile varying such that successively different phases are introduced in at least five locations which are each at successive azimuthal angles (φ$_1$, φ$_2$, ... φ$_N$) and each at a given radial distance from the optical axis, wherein the phase profile is such that the phases introduced, when taken in modulo 2π form, successively cycle through 0 to 2π at least twice, in each cycle taking at least a relatively low value and a relatively high value, whereby the subsidiary beam spot is provided with an intensity distribution on the information layer which overlaps that of the main beam spot side-lobe.

2. An optical scanning device according to claim 1, wherein he phase profile is such that the phases introduced cycle through 0 to 2π three times.

3. An optical scanning device according to claim 1, wherein the first azimuthal angle φ$_1$ and the last azimuthal angle φ$_N$ differ by approximately 2π radians.

4. An optical scanning device according to claim 1, wherein the phases introduced vary monotonically between the first said azimuthal angle φ$_1$ and a third said azimuthal angle φ$_3$.

5. An optical scanning device according to claim 1, wherein the main radiation beam has a first polarisation and the subsidiary radiation beam has a second polarisation, which is substantially orthogonal in relation to the first polarisation.

6. An optical scanning device according to claim 5, wherein the phase modulating arrangement comprises a birefringent element having substantially no effect on the phase profile of the main radiation beam, and providing the said phase profile in the subsidiary radiation beam.

7. An optical scanning device according to claim 1, wherein the main beam and the subsidiary beam are generated using a single radiation emitter.

8. An optical scanning device according to claim 1, wherein the phase modulating arrangement comprises a plurality of angularly-spaced segments, each of the segments having a substantially constant phase profile taken at a constant radius, and wherein each of the said locations are located in a different said segment.

9. An optical scanning device according to claim 1, wherein the phase modulating arrangement comprises a surface providing a continuously varying phase profile.

10. An optical scanning device according to claim 1, wherein the device further comprises a signal processing arrangement for performing crosstalk cancellation using a signal detected in the subsidiary beam.

11. An optical scanning device according to claim 1, wherein the intensity distribution of the subsidiary beam on the information layer is more closely matched with the main beam spot side-lobe by selectively blocking a part of the subsidiary beam.

12. An optical scanning device according to claim 1, wherein the intensity distribution of the main beam spot side-lobe on the information layer is more closely matched with the subsidiary beam by selectively blocking a part of the main beam spot.

13. An optical phase modulating element for generating a non-rotationally-symmetric phase profile in a radiation beam of a predetermined wavelength, the phase profile varying with an azimuthal angle measured about a centre of the element, the phase profile varying such that successively different phases are introduced in at least five locations which are each at successive azimuthal angles ($\phi_1, \phi_2, \ldots \phi_N$) and each at a given radial distance from the centre, wherein the phase profile is such that the phases introduced, when taken in modulo $2\pi$ form, successively cycle through 0 to $2\pi$ at least twice, in each cycle taking at least a relatively low value and a relatively high value.

* * * * *